United States Patent [19]

Goto

[11] Patent Number: 5,862,107
[45] Date of Patent: Jan. 19, 1999

[54] DISC PLAYER CAPABLE OF AUTOMATICALLY INTERCHANGING A PLURALITY OF LOADED DISCS

[75] Inventor: Souju Goto, Yokohama, Japan

[73] Assignee: Kabushiki Kaisha Kenwood, Tokyo, Japan

[21] Appl. No.: 883,961

[22] Filed: Jun. 27, 1997

Related U.S. Application Data

[63] Continuation of Ser. No. 504,316, Jul. 20, 1995, abandoned.

[30]    Foreign Application Priority Data

Jul. 27, 1994 [JP] Japan .................................. 6-193868

[51] Int. Cl.⁶ .................................................. G11B 17/22
[52] U.S. Cl. .............................................. 369/32; 369/33
[58] Field of Search ................................. 369/30, 32–33, 369/36–37, 191–192, 47–50, 54–58; 360/92; 386/125, 126

[56]    References Cited

U.S. PATENT DOCUMENTS

| | | | |
|---|---|---|---|
| 4,755,978 | 7/1988 | Takizawa et al. . | |
| 4,872,151 | 10/1989 | Smith | 369/33 |
| 4,899,326 | 2/1990 | Takeya et al. | 369/36 |
| 5,043,963 | 8/1991 | Iwamoto | 369/36 |
| 5,177,728 | 1/1993 | Otsubo et al. | 369/48 |
| 5,228,021 | 7/1993 | Sato et al. | 369/58 |
| 5,293,362 | 3/1994 | Sakurai et al. | 369/30 |
| 5,309,249 | 5/1994 | Ishii | 358/342 |
| 5,315,570 | 5/1994 | Miura et al. | 369/48 |
| 5,341,352 | 8/1994 | Isobe . | |
| 5,463,605 | 10/1995 | Nishida et al. | 369/58 |

FOREIGN PATENT DOCUMENTS

| | | |
|---|---|---|
| 0389878 | 3/1990 | European Pat. Off. . |
| 0453064 | 10/1991 | European Pat. Off. . |
| 0569245 | 5/1993 | European Pat. Off. . |
| 0569244 | 11/1993 | European Pat. Off. . |

*Primary Examiner*—Brian E. Miller
*Attorney, Agent, or Firm*—Sixbey, Friedman, Leedom & Ferguson, P.C.; Gerald J. Ferguson, Jr.

[57]    ABSTRACT

A changer type disc player capable of reproducing discs in a proper order depending upon the type of disc. The changer type disc player can load a plurality of discs and automatically interchange and reproduces discs, and includes a controller for reading disc management information of all discs after the discs are loaded and controlling to reproduce the plurality of discs in a predetermined order depending upon the types of discs.

6 Claims, 11 Drawing Sheets

FIG. 1

VCD DIRECTORY
INFO. VCD FILE

| Byte | M    L | M    L | M    L | M    L | |
|---|---|---|---|---|---|
| 0 | 00 | FF | FF | FF | SECTOR SYNC. |
| 4 | FF | FF | FF | FF | |
| 8 | FF | FF | FF | 00 | |
| 12 | MIN 00 | SEC 04 | FRAME 00 | MODE 02 | HEADER |
| 16 | FILE NUMBER 00 | CHANNEL NUMBER 00 | SUB MODE 89 | CODING INFORMATION 00 | SUB HEADER |
| 20 | FILE NUMBER 00 | CHANNEL NUMBER 00 | SUB MODE 89 | CODING INFORMATION 00 | |
| 24 (1) | "V" 56 | "I" 49 | "D" 44 | "E" 45 | |
| 28 (5) | "O" 4F | "_" 5F | "C" 43 | "D" 44 | |
| 32 (9) | MAJOR VERSION NO ※ 01 | MAJOR VERSION NO ※ 01 | AL1 | AL2 | |
| 36 (13) | AL3 | AL4 | AL5 | AL6 | |
| 40 (17) | AL7 | AL8 | AL9 | AL10 | DATA |
| 44 (21) | AL11 | AL12 | AL13 | AL14 | |
| 48 (25) | AL15 | AL16 | NUMBER OF VOLUMES IN ALBUM | NUMBER OF VOLUMES IN ALBUM | |
| 52 (29) | VOLUME NUMBER | VOLUME NUMBER | RESERVED 00 | RESERVED 00 | |
| 2068 (2045) | RESERVED 00 | RESERVED 00 | RESERVED 00 | RESERVED 00 | |
| 2072 | EDC | EDC | EDC | EDC | EDC |
| 2076 | ECC | ECC | ECC | ECC | ECC |
| 2348 | ECC | ECC | ECC | ECC | |

DATA AREA BYTE POSITION

|FIG. 11A|FIG. 11B|

FIG. 11

S34 — DISPLAY NO DISC ON DISC TRAY ℓ

S36 — "VCD" NO DISPLAY, HEAD DISC MARK DISPLAY, DISPLAY OF DISC PRESENCE

S38 — "VCD" DISPLAY, HEAD DISC MARK DISPLAY, DISPLAY OF DISC PRESENCE

S40 — "VCD" DISPLAY, HEAD DISC MARK DISPLAY, DISPLAY OF DISC PRESENCE

S43 — FLICKER DISC TRAY NUMBER ℓ

S45 — ℓ = ℓ + 1

S46 — ℓ ≧ 6 ?  YES / NO

S48 — "SELECT" DISPLAY

DISC PLAYER CAPABLE OF AUTOMATICALLY INTERCHANGING A PLURALITY OF LOADED DISCS

This application is a Continuation of Ser. No. 08/504,316, filed Jul. 20, 1995, now abandoned.

BACKGROUND OF THE INVENTION

1. Field of the Invention

The present invention relates to a changer type disc player, and more particularly to a changer type disc player suitable for sequentially reproducing a program such as music, image, and data stored in a plurality of discs.

2. Related Background Art

A conventional changer type disc player such as a changer type CD (compact disc) player reproduces a desired CD when a user selects it by designating the location thereof by a ten-key.

Figure 13:
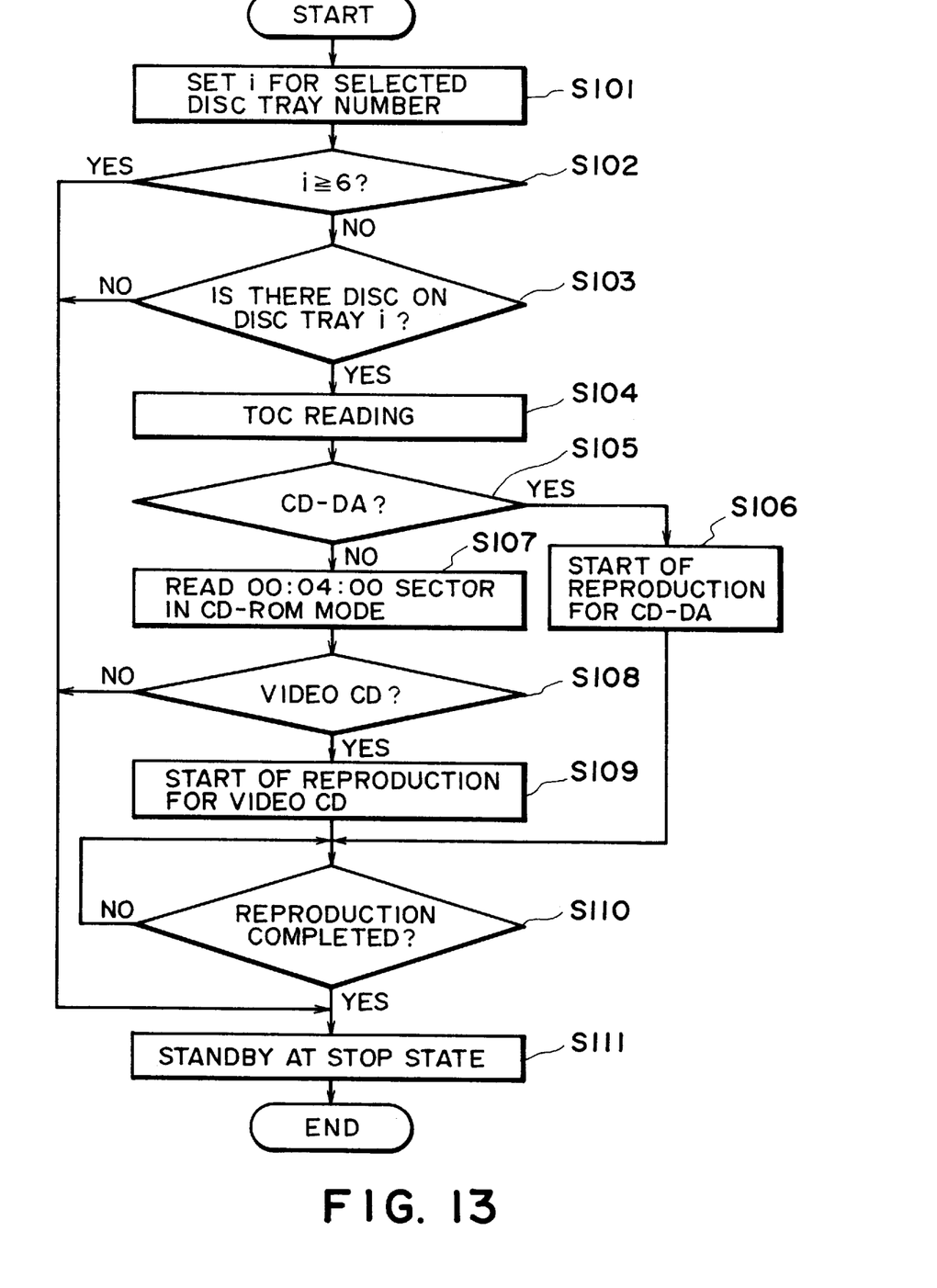
FIG. 13 is a flow chart illustrating the operation of a conventional changer type disc player.

FIG. 13 is a flow chart illustrating the reproduction operation of the changer type disc player. When a disc tray number is designated by a ten-key (Step S101), it is checked whether the CD has been loaded (Step S103). If loaded, the contents of TOC (table of contents) recorded in the CD are read to check the type of the CD (Step S105).

If the disc is a general CD (CD-DA), CD-DA reproduction starts (Step S106). When the reproduction is completed (Step S110), the player stands by at a stop state (Step S111).

If the disc is other than CD-DA, CD-ROM reproduction automatically starts and data at the sector 00:40:00 is read (Step S107). If the disc is a video CD (Step S108), video CD reproduction starts (Step S109). When the reproduction is completed (Step S110), the player stands by at a stop state (Step S111).

In order to sequentially reproduce a plurality of discs, a user is required to input a program of the order of reproduction to the CD player, by designating the locations of discs.

In order to sequentially reproduce a plurality of video discs, such as movie video discs, constituting the same title, a user is required to memory the locations of the discs in the changer type CD player, to input a program of the reproduction order to the CD player, and to instruct a programmed reproduction.

SUMMARY OF THE INVENTION

It is an object of the present invention to eliminate such inconvenience and provide a change type disc player capable of sequentially reproducing discs in a proper order depending upon the type of disc.

According to one aspect of the present invention, there is provided a changer type disc player capable of loading a plurality of discs and automatically interchanging and reproducing discs, comprising: control means for reading disc management information of all discs after the discs are loaded and controlling to reproduce the plurality of discs in a predetermined order depending upon the types of discs.

The control means checks the type of the plurality of loaded discs, and if there is a plurality of discs having the same title, sequentially reproduces the plurality of discs in the sequential order of the discs constituting the same title.

The control means checks the type of the plurality of loaded discs, and if the plurality of discs each have a different title, reproduces the plurality of discs in the order of serial number appended to each disc tray.

The changer type disc player further comprises a display having a first display area for displaying the types of loaded discs in correspondence with a disc tray serial number.

The display has a second display area for discriminating between a disc tray serial number for a disc to be first reproduced among discs having the same title and a disc tray serial number for other discs.

The second display area displays a first mark of a predetermined shape under the disc tray serial number for a disc to be first reproduced among discs having different titles, and a second mark different from the first mark under the disc tray serial number for other discs.

The display has a third display area for displaying an unloaded disc among a plurality of discs constituting the same title.

The display flashes disc tray serial numbers for loaded discs if there is an unloaded disc among a plurality of discs constituting the same title.

Disc management information of all discs is read after the discs are loaded, and a plurality of discs are reproduced in a predetermined order depending upon the types of discs.

The types of a plurality of loaded discs is checked, and if there is a plurality of discs having the same title, the plurality of discs are reproduced in the sequential order of the discs constituting the same title.

The types of a plurality of loaded discs are checked, and if the plurality of discs each have a different title, the plurality of discs are reproduced in the order of serial number appended to each disc tray.

The changer type disc player further comprises a display for displaying the types of loaded discs in correspondence with a disc tray serial number.

The display gives an indication for discriminating between a disc tray serial number for a disc to be first reproduced among discs having the same title and a disc tray serial number for other discs.

The above discrimination is performed by displaying a first mark of a predetermined shape under the disc tray serial number for a disc to be first reproduced among discs having different titles, and a second mark different from the first mark under the disc tray serial number for other discs.

The display also gives an indication of an unloaded disc among a plurality of discs constituting the same title.

The display flashes disc tray serial numbers for loaded discs if there is an unloaded disc among a plurality of discs constituting the same title.

DETAILED DESCRIPTION OF THE PREFERRED EMBODIMENTS

Figure 1:
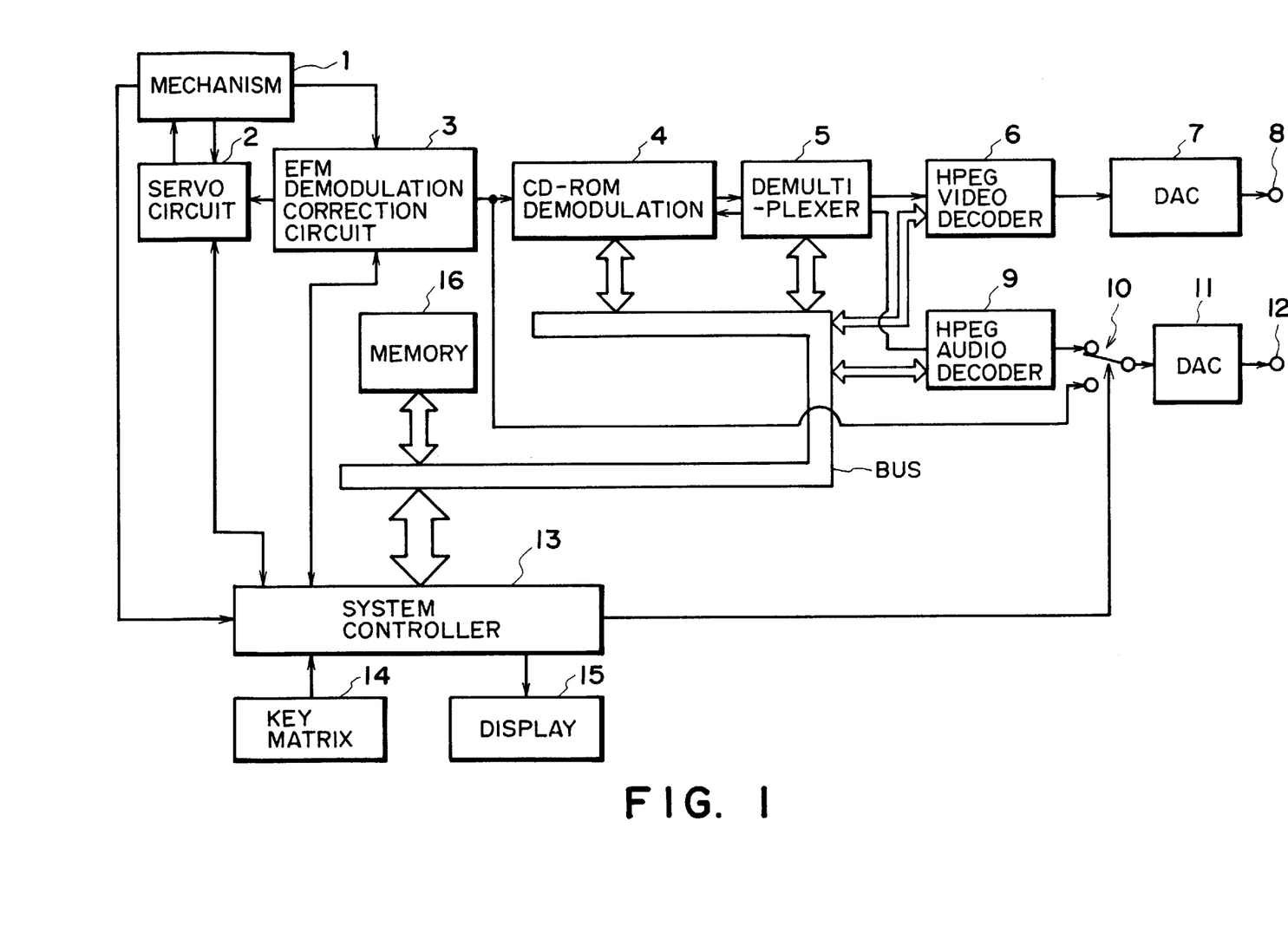
FIG. 1 is a block diagram of a changer type disc player according to an embodiment of the invention.

FIG. 1 is a block diagram of a changer type disc player according to an embodiment of the invention. In this embodiment, the disc player discriminates between various discs such as a general CD (CD-DA), a CD-ROM (inclusive of a video CD), a CD-I, and a CD-BRIDGE, and plays a selected one.

Reference numeral 1 represents a mechanism of a changer type disc player. This mechanism 1 includes a disk housing, a rotary drive mechanism, a changer mechanism, a disc motor, an optical pickup, and a pickup feed mechanism. The disk housing accommodates n disc trays disposed in a regular n-polygon shape, where n is a plural number. The rotary drive mechanism is mounted at the center of the n-polygon shape to rotate the disc housing. The changer mechanism transports a disc selected from the disc housing to a turntable at a predetermined position, and clamps it on the turntable by a clamper. The disc motor causes the clamped disc to rotate. The optical pickup radiates a laser beam to the disc and picks up data recorded in the disc based on a change in diffraction patterns of the reflected beam. The pickup feed mechanism moves the optical pickup radially over the disc.

Reference numeral 2 represents a servo circuit which receives a focus error signal, a tracking error signal, and a laser power monitor signal from the optical pickup of the mechanism 1, and carries out various controls such as focus servo and tracking servo of the optical pickup, laser power control, and optical pickup feed control.

The servo circuit 2 also performs disc motor servo upon reception of a control signal for driving the disc motor from an EFM demodulation/correction circuit 3.

It also controls the changer mechanism of the mechanism 1 upon reception of a signal from a system controller 13.

The EFM demodulation/correction circuit 3 receives a signal picked up by the optical pickup of the mechanism 1, converts it into a binary digital signal, and EFM-demodulates. This demodulated signal is subjected to an error detection and correction process, and outputted.

During the EFM demodulation, the EFM demodulation/correction circuit 3 compares a data read clock with a reference clock, and if necessary, generates and outputs an error signal for the disc rotation control to the servo circuit 2.

Of the output data of the EFM demodulation/correction circuit 3, sub-code Q channel data is supplied to the system controller 13 and data other than the sub-code is supplied to a CD-ROM demodulation circuit 4 and a data selector switch 10.

The CD-ROM demodulation circuit 4 de-scrambles data sent from the EFM demodulation/correction circuit 3 to make it match the CD-ROM format, detects a sector sink, and demodulates the data. A sector sink detection signal and header data are sent via a bus to the system controller 13.

In response to a data write command for an internal memory of the CD-ROM demodulation circuit 4 sent from the system controller 13, the demodulation circuit 4 starts writing data inclusive of the header data into the internal memory at a memory address designated by the system controller 13. An address changes in a ring counter manner. In response to a data write completion command for the internal memory of the CD-ROM demodulation circuit 4 sent from the system controller 13, the CD-ROM demodulation circuit 4 terminates the data write after writing the sector sink in the internal memory.

Data written in the internal memory is outputted to the bus upon an instruction from the system controller 13, and is also outputted to a demultiplexer 5 via a dedicated line.

Upon reception of an instruction from the system controller 13 via the bus, the demultiplexer 5 receives data from the CD-ROM demodulation circuit 4 via the dedicated line. If the received data is not an MPEG bit stream, it is discarded, whereas if it is an MPEG bit stream, it is separated into audio data and video data which are then supplied to an MPEG audio decoder 9 and an MPEG video decoder 6, respectively.

The MPEG video decoder 6 decodes MPEG video data sent from the demultiplexer 5.

Synchronization between video and audio data is established by using video and audio synchronizing data called a system clock reference (SCR), a decoding time stamp (DTS), and a presentation time stamp (PTS), respectively contained in the data sent from the demultiplexer 5.

Upon reception of an instruction from the system controller 13 via the bus, the video decoder 6 performs various controls of, such as general reproduction, still image, frame feed, and slow motion, and switches between output signal modes (NTSC, PAL).

A digital to analog converter (DAC) 7 converts video data received from the MPEG video decoder 6 into analog video data, appends a synchronizing signal thereto, and outputs a composite video signal from a video output terminal 8.

The MPEG audio decoder 9 decodes MPEG audio data sent from the demultiplexer 5.

The timing of starting demodulating MPEG audio data is determined by the video and audio synchronizing data called SCR and PTS contained in the data sent from the demultiplexer 5.

Upon reception of an instruction from the system controller 13 via the bus, the audio decoder 6 performs various controls of, such as normal stereophonic reproduction, monophonic reproduction, L-channel only reproduction, muting, and deemphasis, and outputs reproduced audio data.

Upon reception of an instruction from the system controller 13, the data selector switch 10 selects either output data from the MPEG audio decoder 9 or output data from the EFM demodulation/correction circuit 3.

A digital to analog converter (DAC) 11 converts reproduced audio data sent via the switch 10 into analog audio data, and outputs it from an audio output terminal 12.

The system controller 13 is constituted by a microcomputer. Upon reception of a signal for controlling the changer mechanism sent from the mechanism 1, the system controller 13 instructs the servo circuit 2 to control the changer mechanism. The system controller 13 instructs the servo circuit 2 and EFM demodulation/correction circuit 3 to perform various controls of, such as general reproduction, pose, stop, and search.

Upon reception of sub-code Q channel data recorded in the disc sent from the EFM demodulation/correction circuit 3, the system controller 13 analyzes TOC data, searches CD-DA, and generates time display data.

The system controller 13 issues an instruction via the bus to the CD-ROM demodulation circuit 4 to obtain information such as decoded header data, sub-header data, and sink pulse. Only necessary data stored therein is read via the bus and stored in an external memory 16.

The system controller 13 instructs the start and end of data transfer from the CD-ROM demodulation circuit 4 to the demultiplexer 5.

The system controller 13 instructs the demultiplexer 5, MPEG video decoder 6, MPEG audio decoder 9 to thereby decode an MPEG bit stream and perform various operations such as general reproduction, still image, and frame feed.

The system controller 13 discriminates between discs based on Q code TOC information and on disc management information contained in data decoded by the CD-ROM demodulation circuit 4, to thereby control the data selector switch 10.

In response to a user instruction entered from a key matrix 14, the system controller 13 controls to display disc reproduction information or other information on a display 15. The system controller 13 reads the disc management information (such as Q code TOC necessary for reproduction) from the CD-ROM demodulation circuit 4, writes it via the bus into the memory 16, and reads necessary information from the memory 16 when necessary.

The memory 16 stores therein disc management information necessary for the reproduction.

Figure 2:
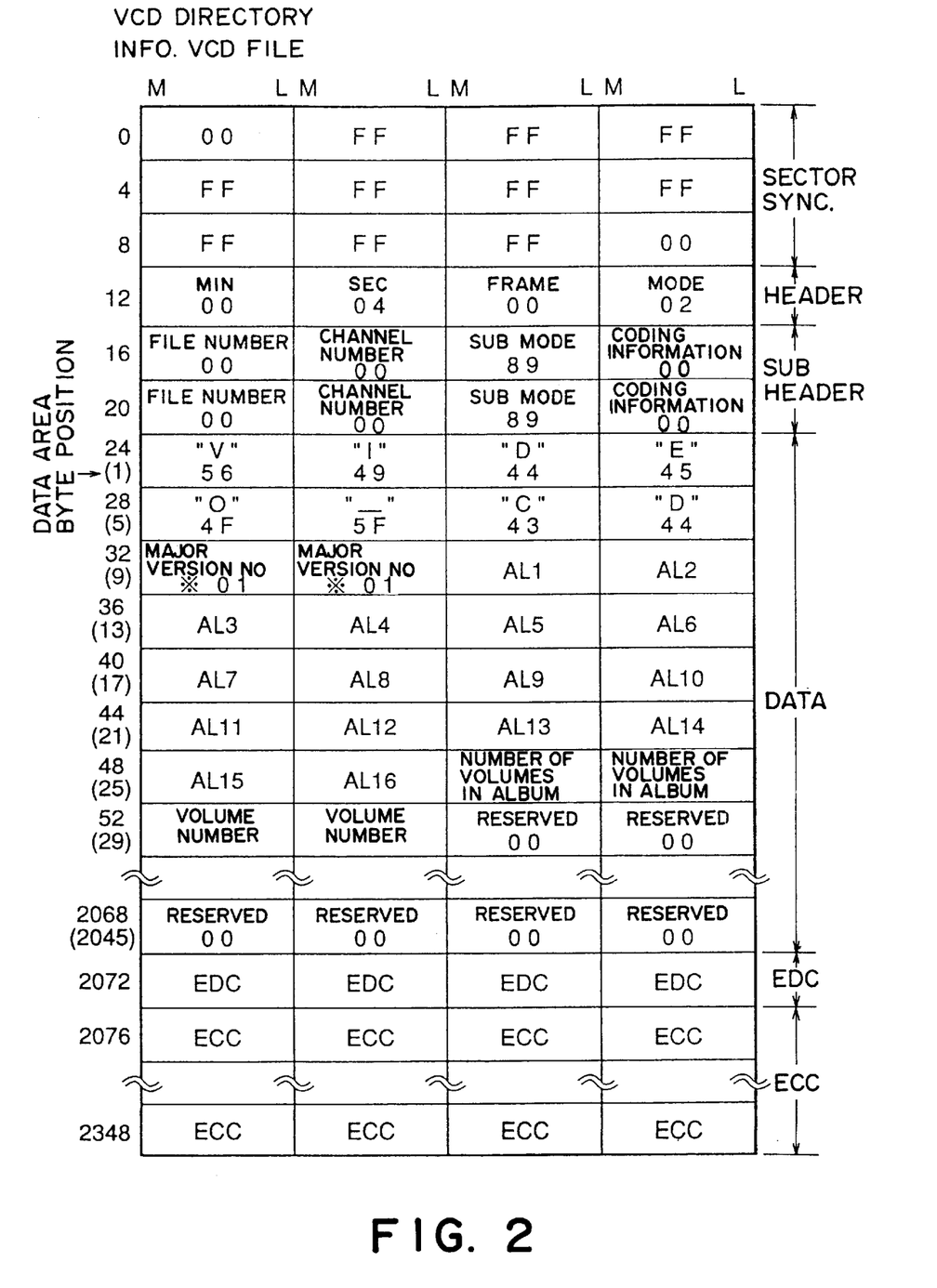
FIG. 2 is a diagram showing the contents of data at a sector 00:04:00 of a video CD.
Figure 3:
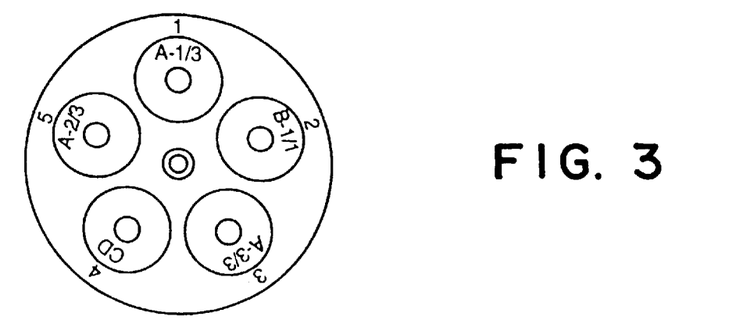
FIG. 3 is a schematic diagram showing an example of discs loaded in the changer type disc player of the invention.
Figure 4:
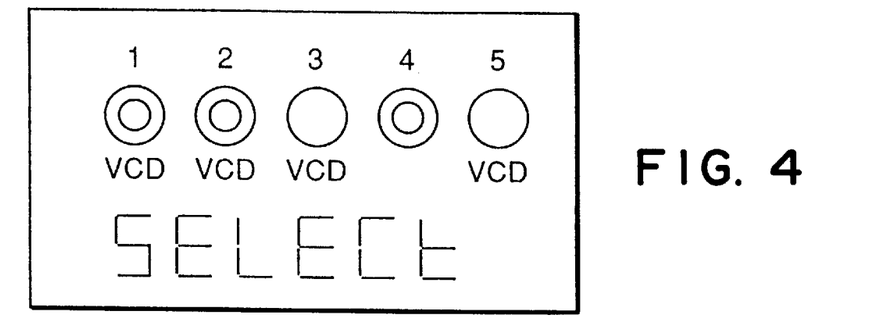
FIG. 4 shows a display example corresponding to the example shown in FIG. 3.
Figure 5:
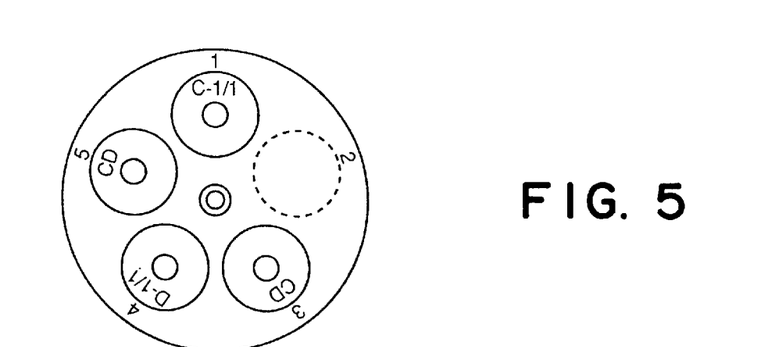
FIG. 5 is a schematic diagram showing another example of discs loaded in the changer type disc player of the invention.
Figure 6:
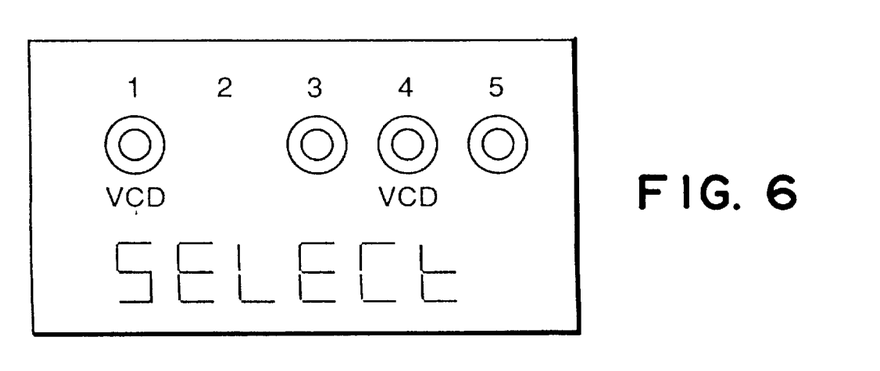
FIG. 6 shows a display example corresponding to the example shown in FIG. 5.
Figure 7:
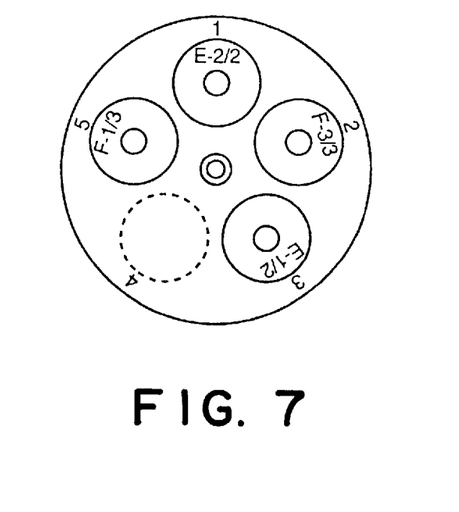
FIG. 7 is a schematic diagram showing still another example of discs loaded in the changer type disc player of the invention.
Figure 8:
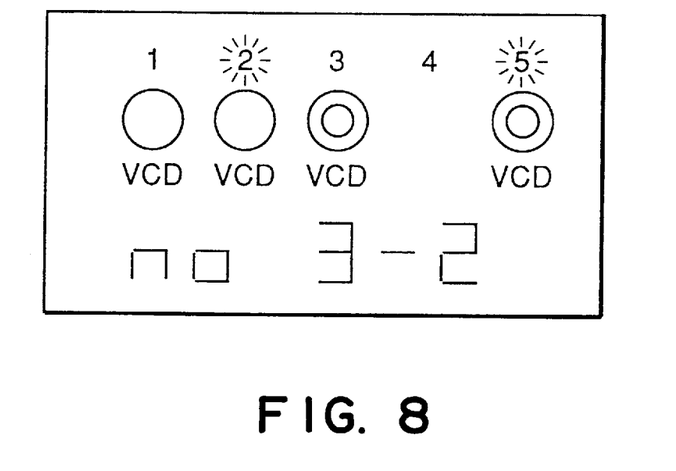
FIG. 8 shows a display example corresponding to the example shown in FIG. 7.

Next, the operation of the changer type CD player shown in FIG. 1 will be described with reference to FIGS. 2 to 12. FIG. 2 is a diagram showing the data contents contained in a sector 00:04:00 of a video CD, FIGS. 3, 5, and 7 are schematic diagrams illustrating examples of loaded discs, FIGS. 4, 6, and 8 are schematic diagrams illustrating display examples corresponding to the examples shown in FIGS. 3, 5, and 7, and FIGS. 9 to 12 are flow charts illustrating the operation of the changer type disc player according to the invention.

Figure 9:
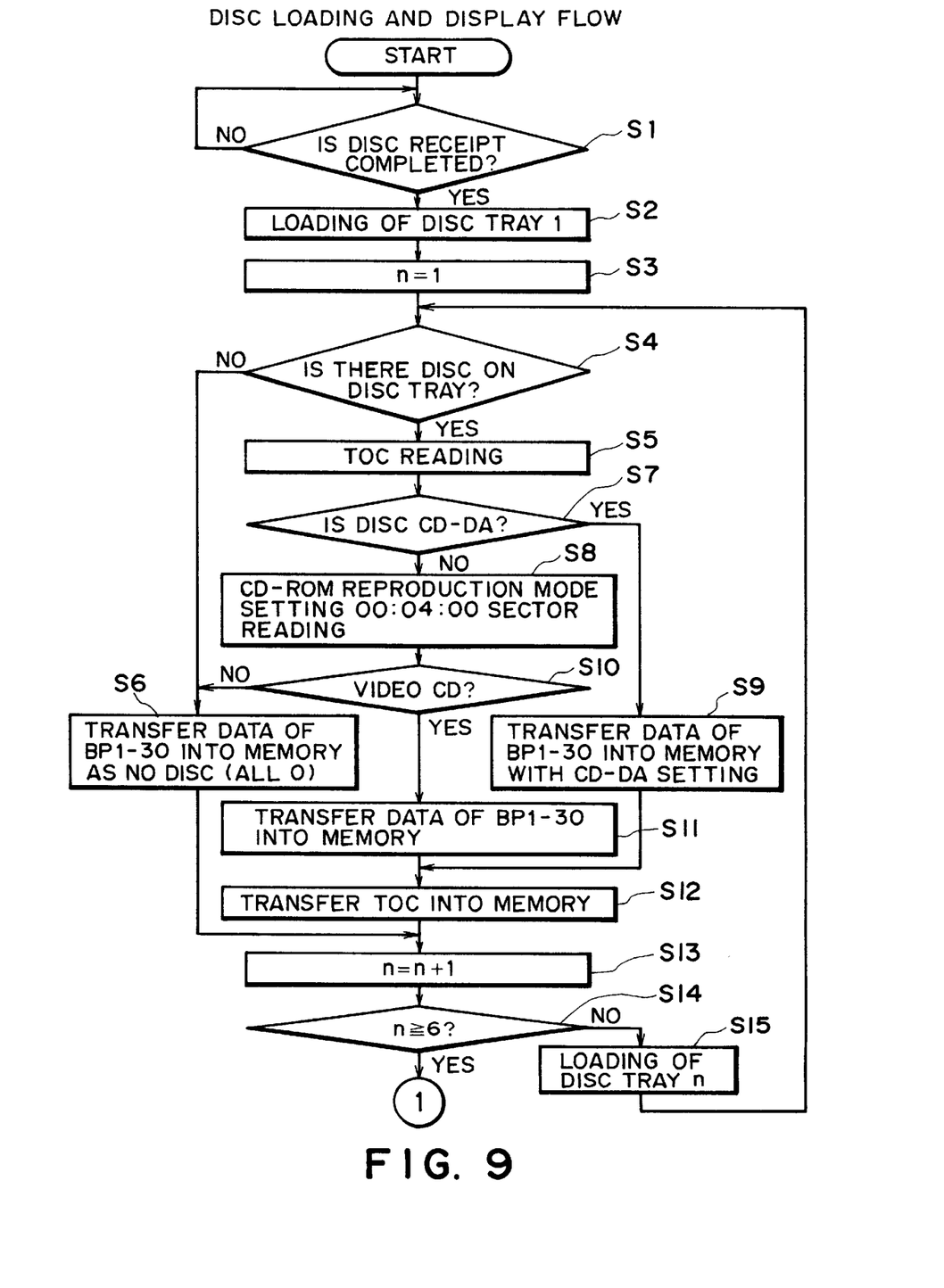
FIGS. 9 to 12 are flow charts illustrating the operation of the changer type disc player of this invention.

First, discs are accommodated on disc trays in the disc housing of the mechanism 1 (Step 1). In this example, it is assumed that there are disc trays Nos. 1 to 5 capable of accommodating five discs. Under the control of the system controller 13, the disc tray No. 1 is loaded (Step 2) and it is judged whether there is any disc on the disc tray No. 1 (Step S4).

If there is any disc on the disc tray, the TOC area of the disc is searched by using the optical pickup of the mechanism 1, servo circuit 2, and EFM demodulation/correction circuit 3 to read TOC data recorded at the sub-code Q channel (Step S5). If there is no disc on the disc tray, data representative of no disc is stored in the memory 16 (Step S6).

If the PSEC value in the TOC data is "00" when the point of the mode "1" is "A0", it is judged that the disc is a CD-DA (conventional CD) disc or a CD-ROM disc, if the value is "10", it is judged that the disc is a CD-I disc, and if the value is "20", it is judged that the disc is a CD-BRIDGE disc (Step S7). In this example, if the PSEC value is "00" and the first control bits of respective points are all "0", it is judged that the disc is a CD-DA disc and there is no title.

If the PSEC value is "20", the system controller 13 searches the sector 00:04:00 of the disc by using the mechanism 1, servo circuit 2, EFM demodulation/correction circuit 3, and CD-ROM demodulation circuit 4, and stores the data in this sector in the internal memory of the CD-ROM demodulation circuit 4 (Step S8).

The data in the sector 00:04:00 is constituted as shown in FIG. 2. In FIG. 2, in the case of coding by ISO646, if excessive data fields are present in the field "AI=Album Identification", spaces are written in these fields. The field "Number of Volumes in Album" is a two-digit binary code and indicates the total number of volumes in the album (which is also written in a primary volume discriptor "Volume Set Size"). The field "Volume Number" is a two-digit binary code and indicates the serial number of a volume in the album (which is also written in a primary volume discriptor "Volume Number"). The field "Byte Position" has reserved fields from "31" to "2048" each having $00 written therein. The field "EDC" stores an error detection code of Form 1. The field "ECC" stores an error correction code of Form 1.

The system controller 13 reads the data at the byte positions (BP) "1" to "8" from the CD-ROM demodulation circuit 4 via the bus, and if "VIDEO_CD" is written therein in ISO646 coding, the system controller 13 judges the disc to be a video CD disc (Step S10). The system controller 13 further reads the data at BPs "11" to "30". Of the data at BPs "11" to "30", the data at BPs "11" to "26" of 16 bytes indicates the title of the disc, the data at BPs "27" and "28" of 2 bytes indicates the number of discs constituting the title, and the data at BPs "29" and "30" of 2 bytes indicates the sequential reproduction order of the disc among the discs constituting the same title.

The system controller 13 stores the disc type, title, the number of discs constituting the same title, the sequential reproduction order of the disc, and TOC data, respectively for each disc tray, in the memory 16 via the bus (Steps S11 and S12).

The above operations are repeated for all disc trays (Step S14).

Consider now the arrangement of discs accommodated on the disc trays in the disc housing as shown in FIG. 3. The system controller 13 checks the discs starting from the disc tray No. 1. The disc on the disc tray No. 1 is a video CD having a title "A" and is the first of three constituent discs. This information and TOC data are written in the memory 16. The disc on the disc tray No. 2 is a video CD having a title "B" and is only one and single disc constituting the title. This information and TOC data are written in the memory 16. The disc on the disc tray No. 3 is a video CD having the title "A" and is the third of three constituent discs. This information and TOC data are written in the memory 16. The disc on the disc tray No. 4 is a general CD (CD-DA). A preset code representative of a general CD and TOC data are written in the memory 16. The disc on the disc tray No. 5 is a video CD having the title "A" and is the second of three constituent discs. This information and TOC data are written in the memory 16.

Figure 10:
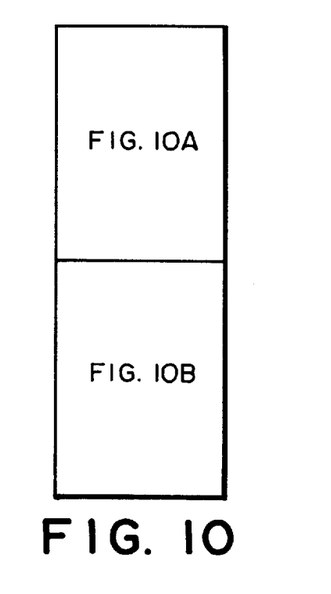
Figure 10A:
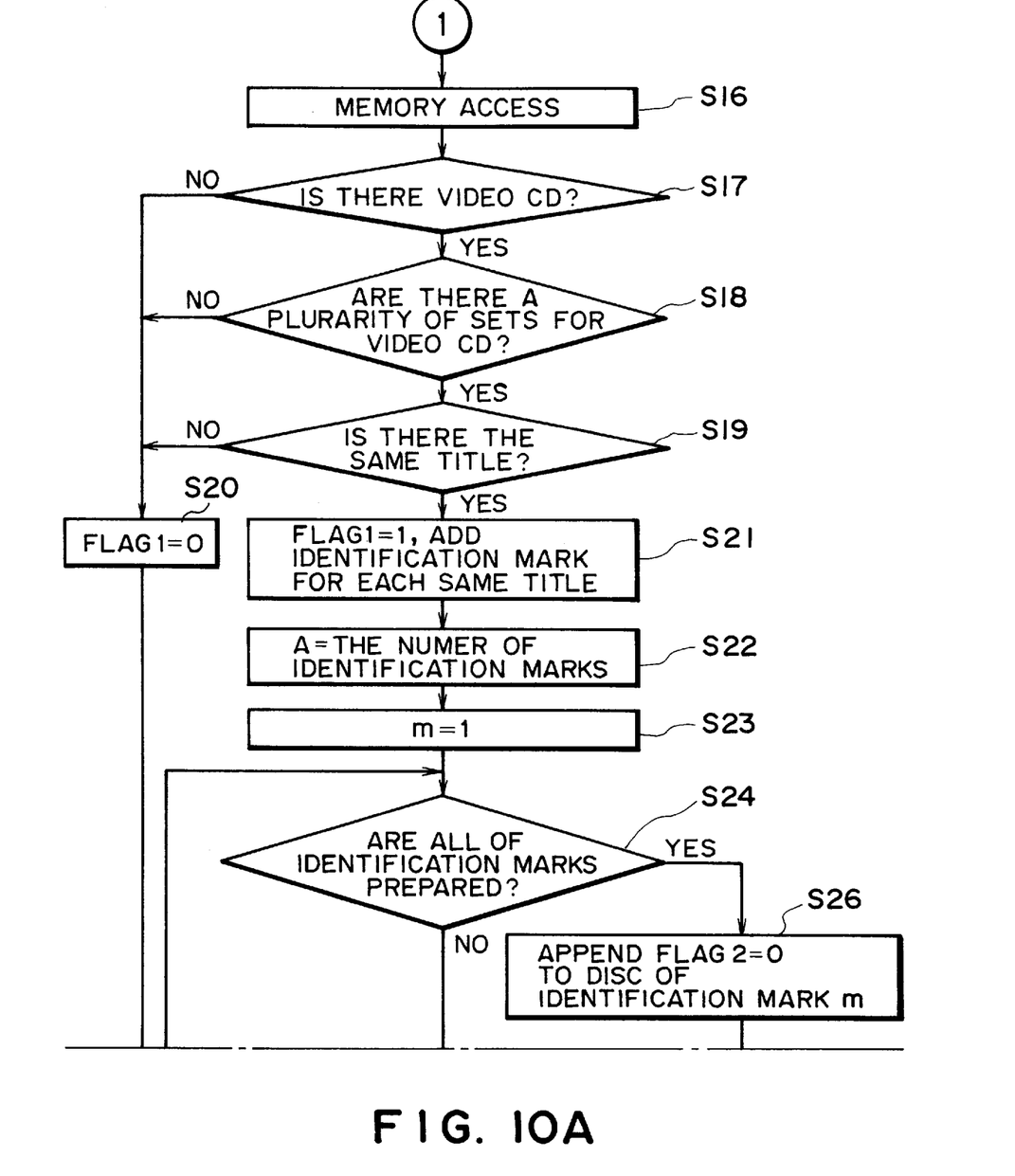
Figure 10B:
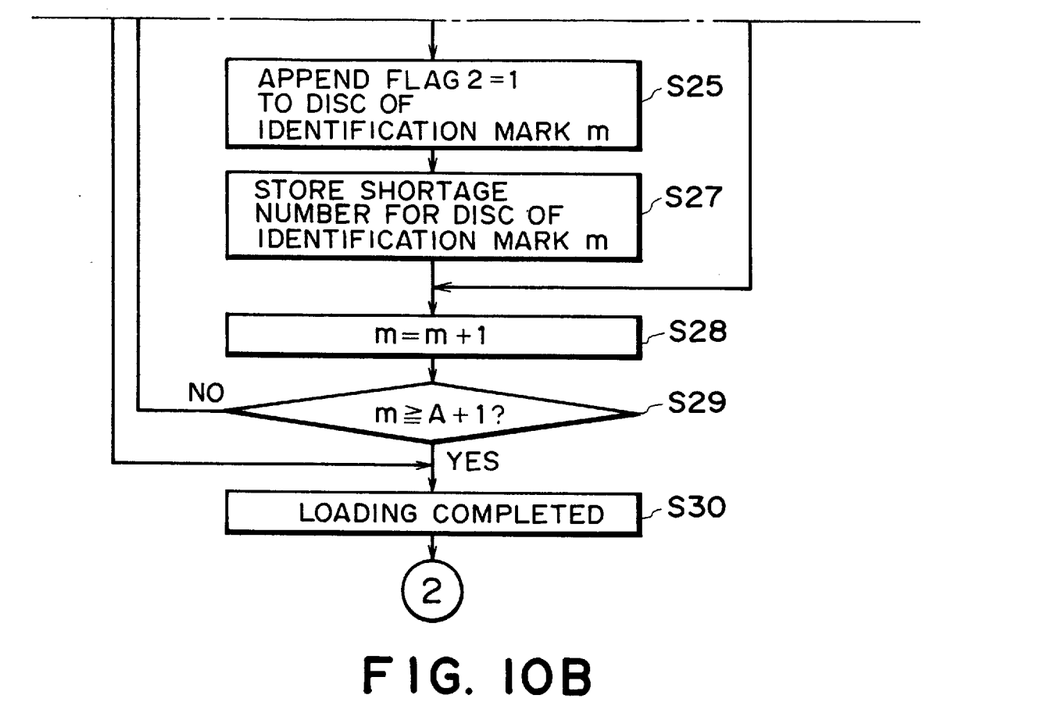

Next, the system controller 13 accesses the memory 16 via the bus (Step S16). If the disc is a video CD (Step S17), the system controller 13 checks the number of discs constituting the same title (Step S18). If the number of discs is two or more, the discs having the same title are searched from the memory 16 (Step S19). In the example shown in FIG. 3, the disc trays Nos. 1, 3, and 5 have all three discs having the same title.

Next, the sequential reproduction order of these discs is checked, and identification marks are appended to these discs so as to allow these discs to be reproduced in the order of the disc trays Nos. 1 to 5 to 3, and set to the system controller 13 (Steps S21 to S29). The disc tray No. 2 has a single disc constituting the title and the disc tray No. 4 is a CD-DA and so a single disc constituting the title, so that data representative of a single disc is set to the system controller 13 (Step S20).

Loading is thus completed (Step S30).

Figures 11, 11B:
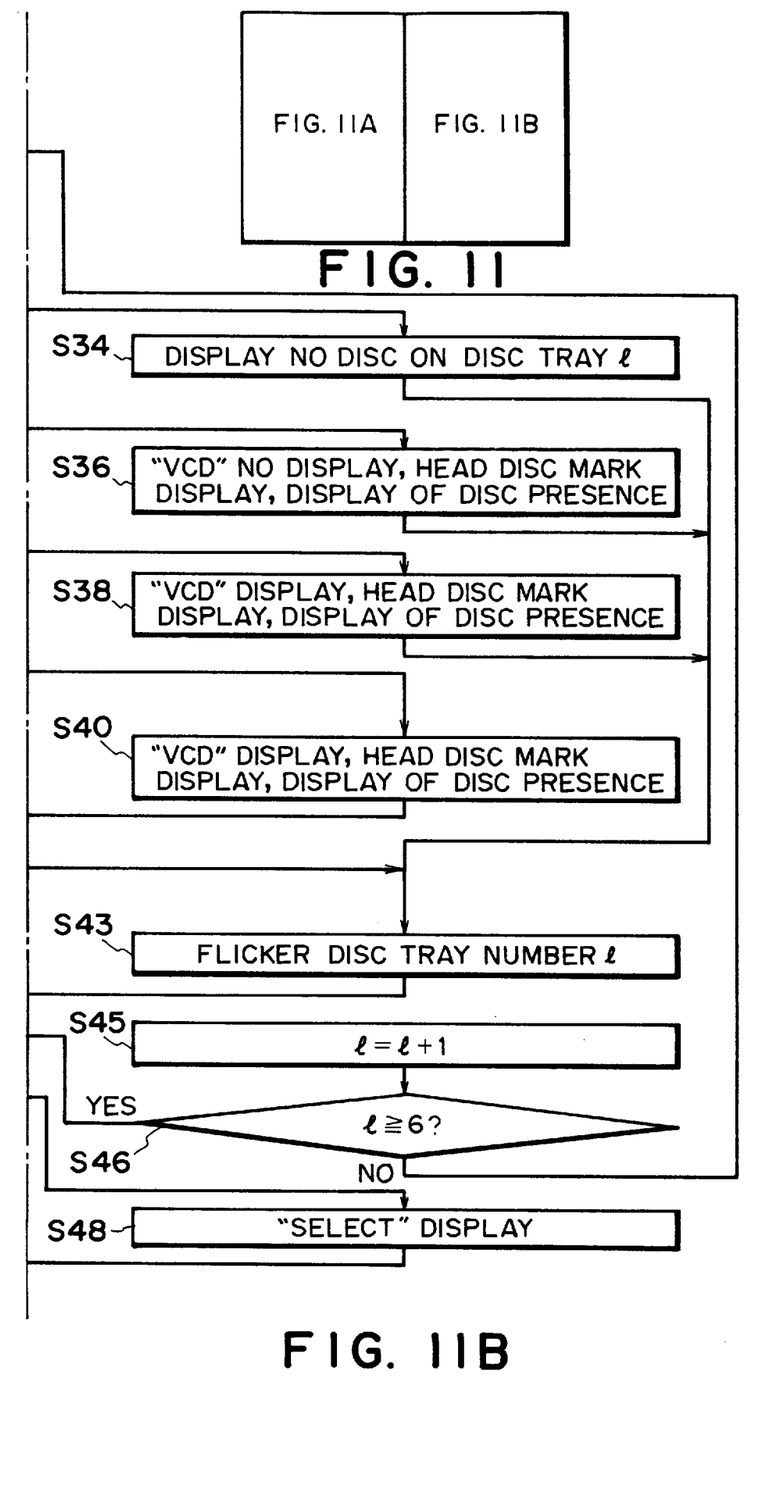
Figure 11A:
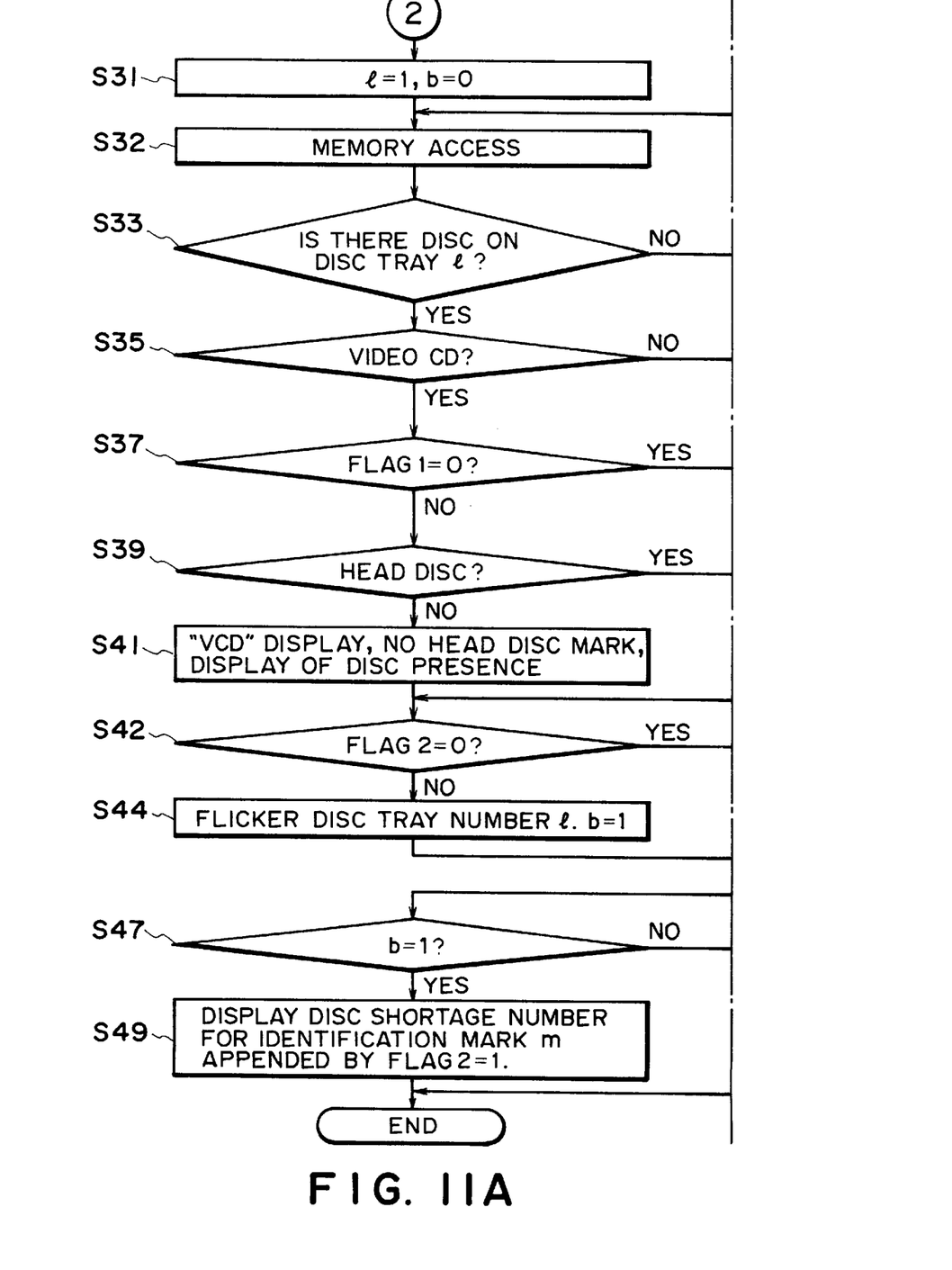

Next, the system controller 13 operates to display whether each disc tray has a disc or not and to display the first of discs constituting the same title in order for a user to visually recognize it (Steps S31 to S49). FIG. 4 shows a display example of the display 15. Displayed numerals "1" to "5" correspond to the disc trays Nos. 1 to 5. Of double circles displayed under the numerals, the outer circle indicates whether there is a disc, and the inner circle indicates the first disc among discs constituting the same title. In this example, a set of the disc trays Nos. 1, 3, and 5 has the same title so that the inner circle is displayed only for the first disc on the disc tray No. 1. The inner circle is also displayed for the disc trays Nos. 2 and 4 because they are each a single disc constituting each title.

Displayed characters under the circles indicate the type of each disc. All the discs other than the disc on the disc tray No. 4 are a video CD. Therefore, a character train "VCD" is displayed under the circles of the disc trays Nos. 1, 2, 3, and 5. No character string is displayed under the double circles of the disc tray No. 4, to thereby indicate that the disc is a general CD.

A six-digit segment display gives a display "SELECT" under the character strings representing the types of discs, for waiting for a user disc selection by the key matrix 14.

Figure 12:
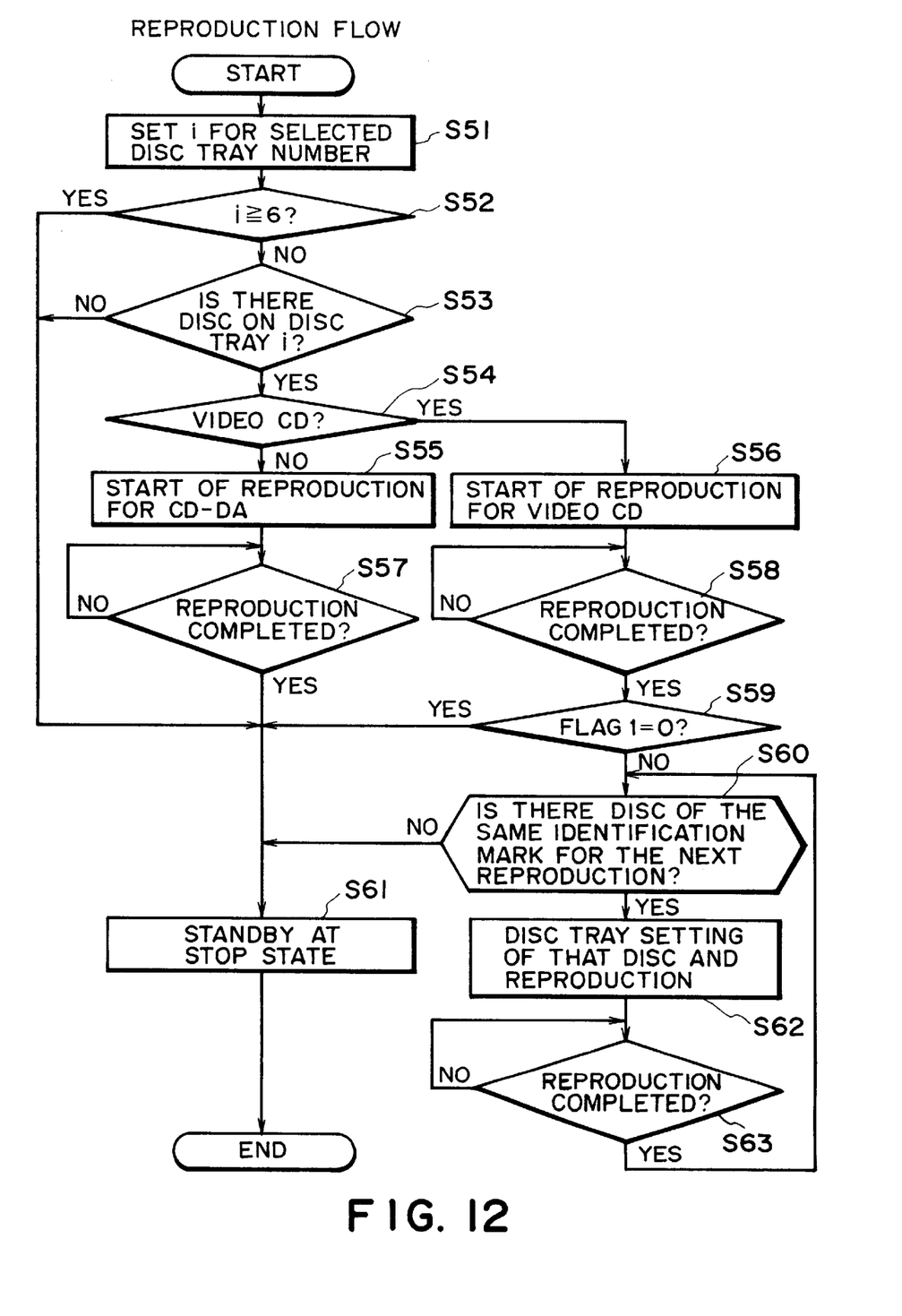

For example, when a user selects the disc tray No. 1 by using the key matrix 14 and depresses a reproduction key (Step S51), the system controller 13 starts reproducing the disc on the disc tray No. 1 (Step S56). When the reproduction of the disc on the disc tray No. 1 is completed (Step S58), the disc to be next reproduced is searched (Step S60) and the disc on the disc tray No. 5 is reproduced (Step S62). When the reproduction of the disc on the disc tray No. 5 is completed (Step S63), Steps S60 to S62 are repeated to reproduce the disc on the disc tray No. 3. When the reproduction of the disc on the disc tray No. 3 is completed, the mechanism 1 is made in a stop state and the disc player stands by with the display shown in FIG. 4 (Step S61). In the above operation, the disc tray No. on the display 15 of the disc under reproduction may be flickered. As above, in order to automatically reproduce discs constituting the same title, either a continuous reproduction key is depressed or the disc tray No. of the first disc is selected and thereafter the reproduction key is depressed.

In the case of the arrangement of loaded discs shown in FIG. 5, the disc on the disc tray No. 1 has a title "C" and is a single disc constituting the title. This information and TOC data are written in the memory 16. There is no disc on the disc tray No. 2 so that a predetermined code representative of no disc is written in the memory 16. Similarly, the contents of the discs on the disc trays Nos. 3 to 5 are checked. The corresponding information and TOC data are stored in the memory 16. FIG. 6 shows a display on the display 15 in this case.

As above, if all discs on the disc trays have different titles, the system controller 13 operates to sequentially reproduce these discs in the order of disc tray Nos. starting from the disc on the disc tray No. 1, when a user depresses the reproduction key on the key matrix 14.

When a "NEXT DISC" key on the key matrix 14 is depressed while the disc on the disc tray No. 1 is reproduced, the system controller 13 starts reproducing the disc on the disc tray No. 3 because there is no disc on the disc tray No. 2 and a code representative of no disc on the disc tray No. 2 is stored in the memory 16. Since the disc on the disc tray No. 2 is a CD-DA, after a reproduction stop instruction is issued to the CD-ROM demodulation circuit 4, demultiplexer 5, MPEG video decoder 6, DAC 7, and MPEG audio decoder 9, and after the data selector switch 10 is changed from the MPEG audio decoder 9 side to the EFM demodulation/correction circuit 3 side, the disc on the disc tray No. 3 is reproduced.

In the case shown in FIG. 3, when the "NEXT DISC" key is depressed during the reproduction, the disc next to the disc under reproduction is reproduced in the looped order of disc trays Nos. 1-5-3-2-4-1. In the case shown in FIG. 5, the next disc after the disc under reproduction is reproduced in the looped order of disc trays Nos. 1-(2)-3-4-5-1 (the disc tray No. 2 is skipped because it has no disc).

In the case of the arrangement of loaded discs shown in FIG. 5, the second disc among three discs constituting the same title "F" of video CDs is not loaded. Therefore, the system controller 13 operates to flash the disc tray Nos. 2 and 5 of the discs constituting the same title and to display "no 3-2" indicating that the second disc among the three discs is not loaded. FIG. 8 is a display on the display 15 in this case.

If a user selects the disc tray No. 5 by using the key matrix 14 to start reproducing, the disc on the disc tray No. 5 is reproduced and thereafter the disc on the disc tray No. 2 is reproduced.

In this case, however, the user can know from the display "no 3-2" that the second disc on the disc tray No. 4 is not loaded, and therefore loads the second disc among the three discs constituting the title "F" of the video CDs. Then, the user selects the disc on the disc tray No. 5 by using the key matrix 14 to start reproducing the discs in the order of the disc trays Nos. 5-4-2.

In the above embodiment, a six-digit segment display is used. Instead, a fourteen-segment display may be used to display a title of a video CD not loaded.

In the above embodiment, a rotary (carrousel) type changer mechanism for loading five discs is used. Instead, a magazine type changer mechanism may be used which can load video CDs more than the rotary type changer mechanism.

Also in the above embodiment, the disc tray No. 1 of the first disc constituting the same title is selected by using the key matrix 14 and the reproduction key is depressed to sequentially reproduce the discs of the same title. In addition to the reproduction key, a sequential reproduction key may be provided to automatically reproduce the discs constituting the same title by depressing this key.

In the above embodiment, the disc management information is read at the time of disc loading. This information may be read when a reproduction key or a sequential reproduction key is depressed.

In the above embodiment, at the same time when the disc management information is read, this information is displayed. This information may be displayed at the time different from when the disc management information is read.

With shock proof memory techniques by header address management practically used by MDs (mini discs), video and audio signals can be reproduced without any interception when video CDs having the same title are exchanged.

According to the present invention, discs can be reproduced in a predetermined order depending upon the type of disc. It is not necessary to load discs in the order of disc tray Nos.

What is claimed is:

1. A changer type disc player capable of loading a plurality of discs and automatically interchanging and reproducing the discs, each of the plurality of discs is loaded in a disc tray with a serial number, the disc player comprising:

means for reading disc management information from each of the discs after the discs are loaded, means for detecting on the basis of the read disc management information whether or not the disc is a video disc, means for detecting on the basis of the read disc management information whether or not the video disc belongs to a set of video discs having a same title, means for extracting from the read disc management information a sequential number of the video disc when the video disc belongs to a set of video discs having the same title, and means for reproducing the plurality of discs in a predetermined order depending on whether or not the discs are video discs and whether or not the video discs belong to a set of video discs having a same title, wherein the video discs belonging to the set of video discs having the same title are are automatically reproduced in the order reproduced in the order of the sequential number extracted from the disc management information of each video disc, and the discs other than the video disc or the video discs each having a different title are automatically reproduced in the order of the serial number appended to each disc tray.

2. A changer type disc player according to claim 1, further comprising a display having a first display area for displaying respective recording formats of loaded discs in correspondence with a disc tray serial number.

3. A changer type disc player according to claim 2, wherein the display has a second display area for discriminating between a disc tray serial number for a video disc to be first reproduced among video discs having the same title and a disc tray serial number for each of the discs not to be first reproduced but to be later reproduced among video discs having the same title.

4. A changer type disc player according to claim 3, wherein the second display area displays a first mark of a predetermined shape under the disc tray serial number for a video disc to be first reproduced among video discs having the same title, and a second mark different from the first mark under the disc tray serial number for each of the video discs not to be first reproduced but to be later reproduced among video discs having the same title.

5. A changer type disc player according to claim 3, wherein the display has a third display area for displaying an unloaded disc among a plurality of video discs having the same title, the presence of the unloaded disc being detected on the basis of that the disc management information can not be read.

6. A changer type disc player according to claim 3, wherein the display is adapted to identify disc tray serial numbers for loaded discs if there is an unloaded disc among a plurality of video discs having the same title, the presence of the unloaded disc being detected on the basis of that the disc management information can not be read.

* * * * *